(12) United States Patent
Austine et al.

(10) Patent No.: US 8,753,444 B2
(45) Date of Patent: Jun. 17, 2014

(54) REINFORCED SULPHUR CONCRETE

(75) Inventors: Juedu Austine, Bangalre (IN); Yiu Chung Cheng, Amsterdam (NL); Michael David Lankshear, Amsterdam (NL); Cees Weijers, Eindhoven (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/881,400

(22) PCT Filed: Oct. 26, 2011

(86) PCT No.: PCT/EP2011/068711
§ 371 (c)(1),
(2), (4) Date: Jun. 13, 2013

(87) PCT Pub. No.: WO2012/055895
PCT Pub. Date: May 3, 2012

(65) Prior Publication Data
US 2013/0247795 A1    Sep. 26, 2013

(51) Int. Cl.
*C04B 28/36* (2006.01)
*E04C 5/01* (2006.01)
*C04B 24/42* (2006.01)

(52) U.S. Cl.
CPC .............. *C04B 28/36* (2013.01); *C04B 24/42* (2013.01); *E04C 5/01* (2013.01)
USPC ...... 106/644; 106/287.32; 106/640; 106/643; 106/806; 106/815; 264/128; 264/333

(58) Field of Classification Search
USPC ............ 106/643, 644, 815, 287.32, 640, 806; 264/128, 333
See application file for complete search history.

(56) References Cited

U.S. PATENT DOCUMENTS

| 4,025,352 | A  | * | 5/1977  | Leutner et al. ............... 501/140 |
| 4,256,499 | A  | * | 3/1981  | Terrel ............................ 501/140 |
| 4,293,463 | A  | * | 10/1981 | Vroom .......................... 524/493 |
| 4,426,428 | A  |   | 1/1984  | Kammer et al. |
| 4,981,740 | A  | * | 1/1991  | Larsen ......................... 428/34.4 |
| 8,137,456 | B2 | * | 3/2012  | Van Trier et al. ............. 106/815 |
| 8,207,249 | B2 | * | 6/2012  | Choe ............................. 524/99 |

FOREIGN PATENT DOCUMENTS

| CN | 101269931 |   | 9/2008 |
| DE | 19801610 |   | 7/1999 |
| JP | 63-35446 | A * | 2/1988 |
| JP | 2003253562 |   | 9/2003 |
| JP | 2007270553 |   | 10/2007 |
| WO | 9920682 |   | 4/1999 |
| WO | 2007051833 |   | 5/2007 |
| WO | 2007065920 |   | 6/2007 |
| WO | 2008148804 |   | 12/2008 |

OTHER PUBLICATIONS

Machine Translation of Japanese Patent Specification No. JP2003-253562A (Sep. 2003).*
Translation of Japanese Patent Application No. JP 63-35446 (Feb. 1988).*
Database WPI, Week 200418; Thomson Scientific; AN 2004-183472; XP002649451.
Database WPI, Week 200903; Thomson Scientific; AN 2004-183472; XP002649452.

* cited by examiner

*Primary Examiner* — Anthony J Green
(74) *Attorney, Agent, or Firm* — Charles W. Stewart

(57) ABSTRACT

Reinforced sulphur concrete wherein one or more metal reinforcing members are in contact with sulphur concrete is disclosed. The reinforced sulphur concrete comprises an adhesion promoter that enhances the interaction between the sulphur and the one or more metal reinforcing members.

8 Claims, No Drawings

REINFORCED SULPHUR CONCRETE

PRIORITY CLAIM

The present application claims priority from PCT/EP2011/068711, filed 26 Oct. 2011, which claims priority from PCT/IN2010/000702, filed 27 Oct. 2010, which is incorporated herein by reference.

FIELD OF THE INVENTION

The present invention provides reinforced sulphur concrete and a process for the preparation of reinforced sulphur concrete.

BACKGROUND OF THE INVENTION

Elemental sulphur or modified sulphur can be used to bind aggregate and filler, thereby providing sulphur concrete. Sulphur concrete can be used in a variety of pre-cast concrete applications such as marine defenses, paving slabs, road barriers and retaining walls.

Concrete materials are typically strong under compression yet demonstrate weakness under extension. Their strength may be improved by incorporating metal reinforcement in the areas of the concrete subject to extension. The inventors have found that, in sulphur concrete, the metal reinforcing members may not adhere well to the sulphur and this can cause problems. The metal may loosen from the sulphur and the metal-sulphur interface may become saturated due to capillary uptake of water, leading to corrosion of the metal and failure of the concrete.

JP 2007 270553 discloses a construction method for preparing metal-reinforced sulphur concrete, but does not address the problem of improving the metal-sulphur interface.

The present inventors have sought to provide improved reinforced sulphur concrete, wherein there is effective adhesion between the sulphur and the metal reinforcing members.

SUMMARY OF THE INVENTION

The inventors have found that adhesion promoters may be incorporated into sulphur concrete, improving the adhesion between the sulphur and the metal reinforcing members. Accordingly, the present invention provides reinforced sulphur concrete wherein one or more metal reinforcing members are in contact with sulphur concrete, wherein the sulphur concrete comprises sulphur, filler, aggregate and, optionally, modifier, and wherein the reinforced sulphur concrete comprises an adhesion promoter that enhances the interaction between the sulphur and the one or more metal reinforcing members.

DETAILED DESCRIPTION OF THE INVENTION

In the reinforced sulphur concrete of the invention, one or more metal reinforcing members are in contact with sulphur concrete. Preferably the one or more metal reinforcing members are encased in sulphur concrete. The metal reinforcing members may be any conventional reinforcements such as bars, grids, plates, fibres, flakes, beams or boxes. The metal reinforcing members are preferably bars, grids or plates; most preferably bars. The metal reinforcing members are preferably steel reinforcing members, but may also be made of aluminium or an alloy such as brass.

The sulphur concrete comprises sulphur, filler, aggregate and, optionally, modifier. Preferably the sulphur concrete comprises from 5 to 40wt % sulphur, from 25 to 50wt % coarse aggregate, from 20 to 40wt % fine aggregate and from 1 to 10wt % filler. The weight percentages are based upon the weight of the sulphur concrete. Coarse aggregate is particulate inorganic material having average diameter from 5 to 40 mm. Fine aggregate is particulate inorganic material having average diameter from 0.1 to 5 mm. Filler is particulate inorganic material having average diameter from 0.1 µm to 0.1 mm. The preferred amounts of sulphur, aggregate and filler are a balance between incorporating sufficient sulphur to bind the aggregate and filler and incorporating sufficient aggregate and filler to provide mechanical strength, whilst ensuring that the mixture has a suitable working viscosity during sulphur concrete manufacture.

The sulphur concrete optionally comprises modifier. Sulphur modifiers are known to the skilled person and are compounds that improve the durability of sulphur concrete. The amount of modifier is preferably from 0.001 to 1 wt %, more preferably from 0.01 to 0.6 wt % and most preferably from 0.01 to 0.4 wt %. The modifier is typically one of the most expensive components in the concrete, so it is desirable to limit the amount of modifier. Suitable modifiers include olefinic modifiers such as 5 ethylidene-2-norbornene (ENB), 5 vinyl-2-norbornene (VNB), dicyclopentadiene, limonene or styrene. Alternatively, the modifier may be an organosilane or an organotitanate.

The reinforced sulphur concrete comprises an adhesion promoter that enhances the interaction between the sulphur and the one or more metal reinforcing members. The adhesion promoter is preferably an organosilane, more preferably an organosilane having one or more sulphide, thiol, amine or alkenyl functional groups. The amount of adhesion promoter is preferably less than 1 wt %, more preferably less than 0.1 wt %, based upon the weight of the reinforced sulphur concrete. It is desirable to incorporate the smallest possible amount of adhesion promoter that achieves the required improvement in properties because the adhesion promoter is typically a costly component of the reinforced sulphur concrete.

Organosilanes are compounds having at least one carbon-silicon bond or at least one carbon-oxygen-silicon group. The organosilanes that are suitably used as adhesion promoters are also suitably used as modifiers in the sulphur concrete.

Preferred organosilanes are organosilanes of the general molecular formula (I):

wherein $R^1$ and $R^2$ are independently $C_{1-6}$ alkyl or hydrogen, and A is a divalent functional group comprising one or more groups chosen from thiol, sulphide, amine or alkenyl groups. Preferably $R^1$ and $R^2$ are ethyl or methyl groups, or hydrogen. Preferably A is a polysulphide group of formula —$(CH_2)_x$—$S_y$—$(CH_2)_z$— wherein x is an integer from 1 to 4, y is an integer from 2 to 8, and z is an integer from 1 to 4. Most preferably x and z are the same and y is from 2 to 6. Particularly preferred organosilanes are bis(3-triethoxysilylpropyl)tetrasulphide and bis(3-triethoxysilylpropyl)disulphide.

The organosilane is alternatively of general formula (II):

wherein $R^3$ is $C_{1-6}$ alkyl or hydrogen, and A' is a univalent functional group comprising one or more groups chosen from thiol, sulphide, amine or alkenyl groups. Preferably $R^3$ is an ethyl or methyl group or hydrogen. Preferably, A' is a thiol group or sulphide group, having the formula —$(CH_2)_p$—

$S_q$—$(CH_2)_r$—H, wherein p is an integer from 1 to 4, q is an integer from 1 to 8 and r is 0 or an integer from 1 to 4. In one embodiment, q is 1 and r is 0, such that A' is a thiol group. In another embodiment, q is from 2 to 8 and r is from 1 to 4, such that A' is a polysulphide group. In another preferred embodiment, A' is a primary amine group of formula —$(CH_2)_n$—$NH_2$, wherein n is an integer from 1 to 4. In yet another preferred embodiment, A' is an alkenyl group of formula —$(CH_2)_m$—X, wherein m is an integer from 0 to 4 and X is an alkenyl group. Possible X groups are shown below:

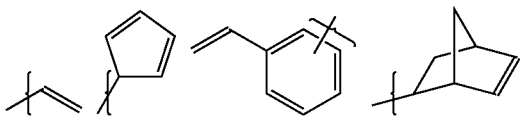

The adhesion promoter may be incorporated into the reinforced sulphur concrete simply by adding the adhesion promoter to the sulphur concrete mix such that the adhesion promoter is dispersed throughout the sulphur concrete. In one embodiment of the invention, the adhesion promoter is concentrated at the interface of the reinforcing members and the sulphur concrete. This can be achieved by treating the one or more metal reinforcing members with the adhesion promoter prior to their incorporation into the sulphur concrete. The one or more metal reinforcing members may be treated with an adhesion promoter which is in the form of a solution or which may undiluted. If a solution is used, the solvent is preferably isopropyl alcohol and/or water. The adhesion promoter (in solution or undiluted) may be applied by any suitable means such as dipping, spraying or painting. Preferably any excess adhesion promoter is removed by rinsing and the metal reinforcing members are suitably dried.

The sulphur concrete according to the invention is preferably prepared by a process comprising steps of:
(a) treating the one or more metal reinforcing members with an adhesion promoter;
(b) mixing sulphur, aggregate, filler and, optionally, modifier at a temperature at which the sulphur is molten;
(c) pouring the molten sulphur admixture into a mould;
(d) before or after step (c), placing the metal reinforcing members in the mould; and
(e) cooling to a temperature at which the sulphur solidifies.

Alternatively, the sulphur concrete according to the invention may be prepared by a process comprising steps of:
(a) mixing sulphur, aggregate, filler, adhesion promoter and, optionally, modifier at a temperature at which the sulphur is molten;
(b) pouring the molten sulphur admixture into a mould;
(c) before or after step (b), placing the metal reinforcing members in the mould; and
(d) cooling to a temperature at which the sulphur solidifies.

In both processes of the invention, the sulphur and other components are mixed at a temperature at which the sulphur is molten, i.e. typically above 120° C., preferably in the range of from 120 to 150° C., more preferably in the range of from 125 to 140° C. The metal reinforcing members are preferably placed into the mould before the molten sulphur admixture is poured into the mould, but may alternatively be placed into the molten sulphur admixture whilst it is in the mould. On cooling, the sulphur solidifies and the sulphur concrete article may be demoulded.

Preferably the one or more metal reinforcing members are cleaned prior to their exposure to the adhesion promoter. Such a pre-cleaning step can remove contaminants from the surfaces of the one or more metal reinforcing members, and this can lead to further improved adhesion between the metal reinforcing members and the sulphur. The cleaning step is suitably any conventional cleaning method such as washing with water, ultra-sonic cleaning in acetone, polishing with grit paper or treatment with Piranha solution (mixture of sulphuric acid and hydrogen peroxide).

Sulphur concrete articles produced according to the invention can be used in a variety of pre-cast concrete applications such as marine defenses, paving slabs, road barriers and retaining walls.

EXAMPLES

The invention is further illustrated by means of the following non-limiting examples.
Adhesion Tests Adhesion tests were carried out to assess whether organosilanes improve the adhesion between sulphur and metal surfaces. Two organosilanes were used: bis[3-(tri-ethoxysilyl)propyl]tetrasulfide (TESPT) and n-propyltriethoxysilane (PTES). Three metals were used: stainless steel, brass and aluminium.

The organosilanes were hydrolysed before they were used to treat the metals. A mixture of 2-propanol (IPA), organosilane and water were loaded in a round bottom flask, (ratio was 90% IPA:5% organosilane:5% water (weight %)). The mixture was stirred at ambient temperature for at least two days before use.

The metal plates were treated by dipping into a solution of hydrolysed coupling agent for one minute. The metal was placed into a silicon mould and placed in a oven at 115° C. for 30 minutes. For comparative examples without organosilane treatment, the metal was firstly wiped with a tissue and was placed in the silicon mould before putting into the oven for the same time and temperature.

Sulphur was melted and then poured over the preheated metal plate, so that the silicon mould was at least half filled. Then the liquid was left to solidify and was demoulded afterwards. The cup was turned upside down so that the metal surface was on top and could be used for strength measurement.

The equipment used for the measurement of adhesion strength was a Pull-Off adhesion tester. This piece of equipment is used to test adhesion, mainly in coating industries. A dolly was glued to the metal plate and, after drying of the glue, force was applied to pull the metal plate off the sulphur, thereby measuring the adhesion strength between sulphur and metal.

Table 1 shows the adhesion measurement results for comparative examples with no organosilane treatment (comparative examples 1, 3 and 5), examples of the invention having been treated with TESPT (examples 1, 2 and 3) and comparative examples having been treated with PTES (comparative examples 2, 4, and 6).

TABLE 1

|  | Metal | Organosilane | Force required (MPa) |
|---|---|---|---|
| Comparative Example 1 | Stainless Steel | None | 0.47 |
| Example 1 | Stainless Steel | TESPT | 0.90 |
| Comparative Example 2 | Stainless Steel | PTES | 0.15 |
| Comparative | Brass | None | 0.70 |

TABLE 1-continued

| | Metal | Organosilane | Force required (MPa) |
|---|---|---|---|
| Example 3 | | | |
| Example 2 | Brass | TESPT | 0.75 |
| Comparative Example 4 | Brass | PTES | 0.15 |
| Comparative Example 5 | Aluminium | None | 0.22 |
| Example 3 | Aluminium | TESPT | 0.55 |
| Comparative Example 6 | Aluminium | PTES | 0.15 |

The results show that treatment with TESPT considerably improved the adhesion between the sulphur and the metal (steel, brass and aluminium); more force was required to remove the metal plate from the sulphur when the metal plate had been treated with TESPT. By contrast, treatment with PTES (an organosilane that does not have a sulphide, thiol, amine or alkenyl functional group) led to decreased adhesion between the sulphur and the metal.

What is claimed is:

1. A reinforced sulphur concrete, comprising: one or more metal reinforcing members in contact with sulphur concrete, wherein the sulphur concrete comprises sulphur, filler, and aggregate, and wherein the reinforced sulphur concrete further comprises an adhesion promoter that enhances the interaction between the sulphur and the one or more metal reinforcing members, wherein the adhesion promoter is an organosilane of general molecular formula (I):

$$(R^1O)_3Si\text{-}A\text{-}Si(OR^2)_3 \qquad (I)$$

wherein $R^1$ and $R^2$ are independently $C_{1-6}$ alkyl and A is a divalent functional group comprising one or more groups chosen from thiol, sulphide, amine or alkenyl groups, and wherein the one or more metal reinforcing members are bars, grids or plates.

2. A reinforced sulphur concrete according to claim 1, wherein the organosilane is bis(3-triethoxysilylpropyl)tetrasulphide.

3. A reinforced sulphur concrete according to claim 1, wherein the one or more metal reinforcing members are steel reinforcing members.

4. A reinforced sulphur concrete according to claim 1, wherein the one or more metal reinforcing members have been treated with an adhesion promoter prior to their incorporation into the sulphur concrete.

5. A process for preparing reinforced sulphur concrete according to claim 1, comprising steps of:
   (a) treating the one or more metal reinforcing members with the adhesion promoter, wherein the adhesion promoter is an organosilane of general molecular formula (I):

$$(R^1O)_3Si\text{-}A\text{-}Si(OR^2)_3 \qquad (I)$$

wherein $R^1$ and $R^2$ are independently $C_{1-6}$ alkyl and A is a divalent functional group comprising one or more groups chosen from thiol, sulphide, amine or alkenyl groups;
   (b) mixing sulphur, aggregate, and filler at a temperature at which the sulphur is molten;
   (c) pouring the molten sulphur admixture into a mould;
   (d) before or after step (c), placing the metal reinforcing members in the mould; and
   (e) cooling to a temperature at which the sulphur solidifies.

6. A process for preparing sulphur concrete according to claim 1, comprising steps of:
   (a) mixing sulphur, aggregate, filler and adhesion promoter at a temperature at which the sulphur is molten;
   (b) pouring the molten sulphur admixture into a mould;
   (c) before or after step (b), placing the metal reinforcing members in the mould; and
   (d) cooling to a temperature at which the sulphur solidifies.

7. A process for preparing reinforced sulphur concrete according to claim 5, wherein, before step (a), there is a step of cleaning the one or more metal reinforcing members.

8. A process as recited in claim 5, wherein the organosilane is selected from either bis(3-triethoxysilylpropyl)tetrasulphide or bis(3-triethoxysilylpropyl)disulphide.

* * * * *